US009923790B2

(12) United States Patent
Patel et al.

(10) Patent No.: US 9,923,790 B2
(45) Date of Patent: Mar. 20, 2018

(54) METHOD AND SYSTEM FOR MONITORING AND CONTROLLING A VIDEO SIGNAL NETWORK

(75) Inventors: Rakesh Patel, Mississauga (CA); Vojin Nikolic, Oakville (CA); Alpesh Patel, Mississauga (CA)

(73) Assignee: Evertz Microsystems Ltd., Burlington (CA)

( * ) Notice: Subject to any disclaimer, the term of this patent is extended or adjusted under 35 U.S.C. 154(b) by 1049 days.

(21) Appl. No.: 12/423,465

(22) Filed: Apr. 14, 2009

(65) Prior Publication Data

US 2009/0257360 A1    Oct. 15, 2009

Related U.S. Application Data

(60) Provisional application No. 61/044,693, filed on Apr. 14, 2008.

(51) Int. Cl.
*G06F 15/173* (2006.01)
*H04L 12/26* (2006.01)
*H04L 12/24* (2006.01)

(52) U.S. Cl.
CPC ...... *H04L 43/0817* (2013.01); *H04L 41/0879* (2013.01); *H04L 41/0213* (2013.01); *H04L 41/22* (2013.01); *H04L 43/16* (2013.01)

(58) Field of Classification Search
CPC ............. H04L 41/0879; H04L 43/0817; H04L 41/0213; H04L 43/16; H04L 41/22
(Continued)

(56) References Cited

U.S. PATENT DOCUMENTS 5,600,382 A    2/1997  Won
6,564,342 B2 *  5/2003  Landan .......................... 714/48
(Continued)

FOREIGN PATENT DOCUMENTS

WO    2000076208 A2    12/2000

OTHER PUBLICATIONS

Document relating to Canadian Application No. 2,669,464 (Office Action), dated Mar. 20, 2017.

*Primary Examiner* — Philip Chea
*Assistant Examiner* — Robert B McAdams
(74) *Attorney, Agent, or Firm* — Bereskin & Parr LLP/S.E.N.C.R.L., s.r.l.

(57) ABSTRACT

The embodiments described herein provide a method for operating a video signal network. The method comprises: providing a video signal router having a plurality of input ports for receiving input video signals and a plurality of output ports for transmitting a plurality of output video signals and wherein the router has a plurality of monitorable router status conditions; providing a router control system for controlling the configuration of the router; defining, in the router control system, a plurality of predetermined states, wherein each of the predetermined states comprises at least one condition from the group consisting of: one or more signal conditions relating to one or more of the input and output video signals; and one or more router conditions relating to one or more of the monitorable status conditions; for each of the states, defining at least one action; configuring the video signal router to couple at least some of the input ports to at least some of the output ports; monitoring at least some of the input and output video signals and at least some of the router status conditions; in response to the monitored input and output video signals and router status conditions corresponding to one of the predetermined states, transmitting a notification message to the router control system; and initiating an action corresponding to the transmitted notification message.

30 Claims, 10 Drawing Sheets

(58) Field of Classification Search
USPC .......................................................... 709/224
See application file for complete search history.

(56) References Cited

U.S. PATENT DOCUMENTS

| | | | |
|---|---|---|---|
| 7,002,637 B2* | 2/2006 | Szybiak | H04N 17/00 |
| | | | 348/180 |
| 2002/0004915 A1* | 1/2002 | Fung | 713/320 |
| 2003/0028584 A1* | 2/2003 | Coniglio et al. | 709/200 |
| 2003/0041142 A1* | 2/2003 | Zhang et al. | 709/224 |
| 2003/0065803 A1* | 4/2003 | Heuvelman | H04N 21/25808 |
| | | | 709/231 |
| 2004/0205724 A1* | 10/2004 | Mayberry | 717/124 |
| 2007/0028303 A1* | 2/2007 | Brennan | 726/24 |
| 2007/0040900 A1* | 2/2007 | Castles | 348/14.08 |
| 2007/0185989 A1* | 8/2007 | Corbett et al. | 709/224 |
| 2009/0064248 A1* | 3/2009 | Kwan et al. | 725/109 |
| 2009/0190653 A1* | 7/2009 | Seo | H04N 5/765 |
| | | | 375/240.01 |

* cited by examiner

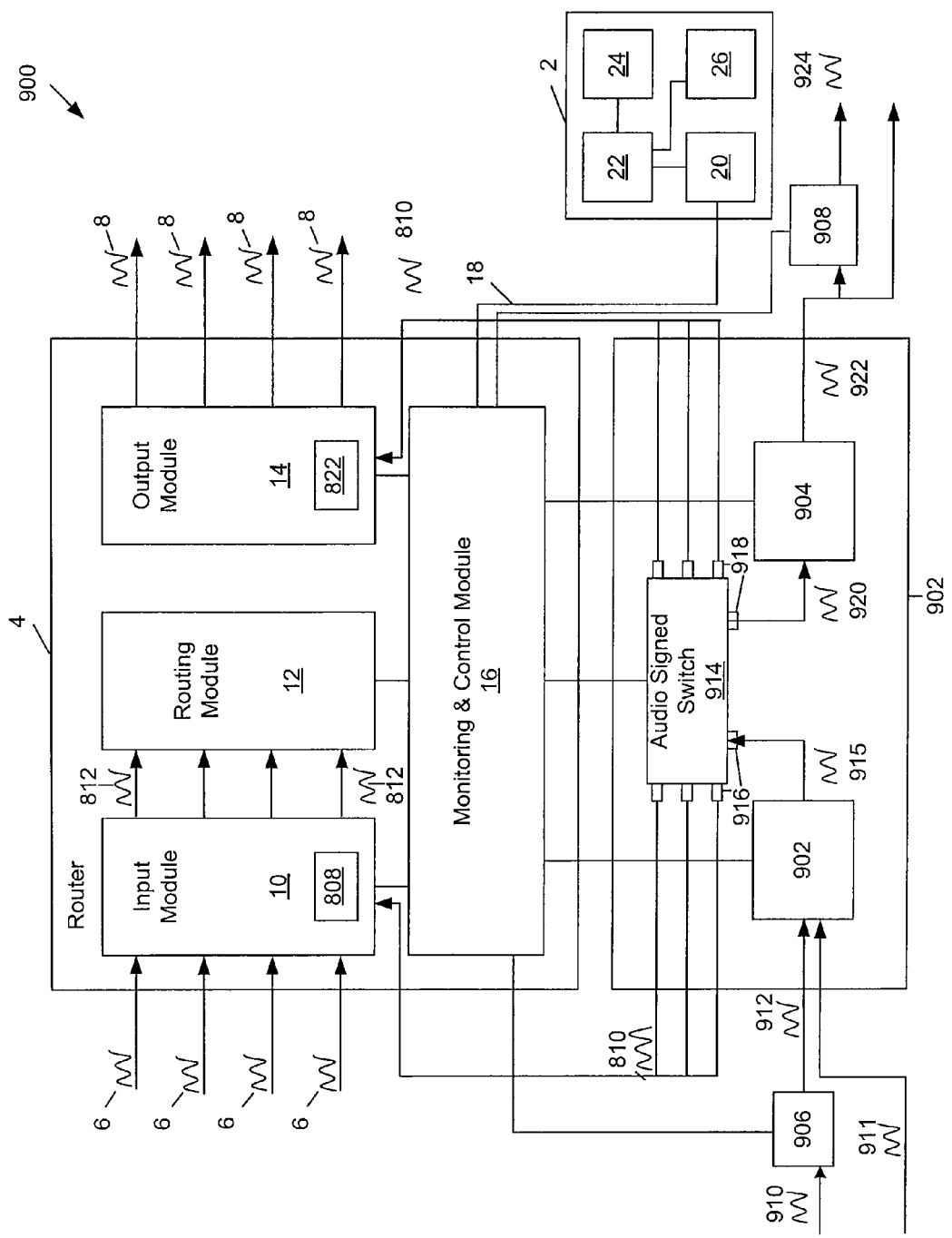

METHOD AND SYSTEM FOR MONITORING AND CONTROLLING A VIDEO SIGNAL NETWORK

FIELD

The described embodiments relate to methods and systems for monitoring a video signal network.

BACKGROUND

As video broadcast networks become larger and more complicated, it is important to effectively monitor the video signals throughout the network so that operators can respond quickly to problems when they arise. SNMP-based signal monitoring systems have been developed to address this need. In these systems monitoring devices are deployed throughout the network to monitor the video signals throughout the network. These devices send SNMP messages to a central monitoring system that presents signal status information to an operator. These systems also typically provide means for an operator to alter the configuration of the devices in the network.

However, most of these systems require operator intervention to respond to signal status changes. Accordingly there is a need for methods and systems for monitoring a video signal network where the monitoring system can be configured to automatically respond to signal status changes in an intelligent manner.

SUMMARY

In a first aspect, some embodiments of the invention provide a method of operating a video signal network. The method comprising: providing a video signal router having a plurality of input ports for receiving input video signals and a plurality of output ports for transmitting a plurality of output video signals and wherein the router has a plurality of monitorable router status conditions; providing a router control system for controlling the configuration of the router; defining, in the router control system, a plurality of predetermined states, wherein each of the predetermined states comprises at least one condition from the group consisting of: one or more signal conditions relating to one or more of the input and output video signals; and one or more router conditions relating to one or more of the monitorable status.

In a second aspect, some embodiments of the invention provide a method of operating a video signal network. The method comprising: providing a video signal router having a plurality of input ports for receiving input video signals and a plurality of output ports for transmitting a plurality of output video signals and wherein the router has a plurality of monitorable router status conditions; providing a configurable expert control system for controlling the configuration of the router; defining, in the control system, a plurality of predetermined signal conditions that when meet within a given order, or under simultaneous transitions, wherein each of the predetermined states comprises at least one condition from the group consisting of: one or more signal conditions relating to one or more of the input and output video signals; and one or more router conditions relating to one or more of the monitorable status or parameters conditions; for each of the states, defining at least one action; configuring the video signal router to couple at least some of the input ports to at least some of the output ports; monitoring at least some of the input and output video signals and at least some of the router status conditions; in response to the monitored input and output video signals and router status conditions corresponding to one of the predetermined states, transmitting a notification message to the router control system; and initiating an action corresponding to the transmitted notification message.

In a third aspect, some embodiments of the invention provide a system for monitoring a video signal network. The system comprises: a video signal router comprising: a routing module for routing a plurality of video signals from a plurality of input ports to a plurality of output ports; and a monitoring module for monitoring the routing module and at least some of the video signals, and transmitting one of a plurality of notification messages when one of the router and the plurality of video signals reach one of a plurality of predetermined states; and a monitoring device in electronic communication with the router, the monitoring device comprising: a graphical user interface for configuring a plurality of automatic responses wherein each automatic response corresponds to one of the plurality of notification messages and outlines a procedure to be executed when the corresponding notification message is received by the monitoring device, and a processor for receiving the transmitted notification message, determining whether one of the plurality of automatic responses corresponds to the transmitted notification message, and if one of the plurality of automatic responses corresponds to the transmitted notification message, executing the corresponding automatic response.

In a fourth aspect, some embodiments of the invention provide a system for monitoring a video signal network through transformation of a native input signal to a more appropriate state thus allowing for effective monitoring that is only valid in the transformed state. The system comprises: a video signal router comprising: a routing module for routing a plurality of video signals from a plurality of input ports to a plurality of output ports; and a monitoring functions that are embedded into all modules compromising the router. For monitoring the routing module and at least some of the video signals, and transmitting one of a plurality of notification messages when one of the router and the plurality of video signals reach one of a plurality of predetermined states; and a monitoring device in electronic communication with the router, the monitoring device comprising: a expert logic engine that runs through various states given stimulus from the router's monitored parameters resulting in automatic actions being taken, and then presenting the information and actions taken in the form of a graphical user interface. Also provide for method of dynamically without recompiling of the expert system engine, configuring a plurality of automatic responses wherein each automatic response corresponds to one of the plurality of notification messages and outlines a procedure to be executed when the corresponding notification message is received by the monitoring device, and a processor for receiving the transmitted notification message, determining whether one of the plurality of automatic responses corresponds to the transmitted notification message, and if one of the plurality of automatic responses corresponds to the transmitted notification message, executing the corresponding automatic response.

In a fifth aspect, some embodiments of the invention provide a method of monitoring a video signal network. The method comprises: configuring a plurality of automatic responses using a graphical user interface, wherein each automatic response corresponds to one of a plurality of notification messages and outlines a procedure to be executed when the corresponding notification message is received by a monitoring system; monitoring a video signal router and a plurality of input video signals processed by the video signal router using a monitoring module of the video signal router; transmitting one of the plurality of notification messages from the video signal router to the monitoring system, when one of the router and the plurality of video signals reach one of a plurality of predetermined states; receiving the transmitted notification message at the monitoring system, determining whether one of the plurality of automatic responses corresponds to the transmitted notification message; and if one of the plurality of automatic responses corresponds to the transmitted notification message, executing the corresponding automatic response.

In a sixth aspect, some embodiments of the invention provide a method of monitoring a video signal network. The method comprises: transformation of the signal from its native compressed format into a baseband format and then monitoring aspects of the signal in the compressed and baseband form, then configuring a plurality of automatic responses using a graphical user interface, wherein each automatic response corresponds to one of a plurality of notification messages and outlines a procedure to be executed when the corresponding notification message is received by a monitoring system; monitoring a video signal router and a plurality of input video signals processed by the video signal router using a monitoring module of the video signal router; transmitting one of the plurality of notification messages from the video signal router to the monitoring system, when one of the router and the plurality of video signals reach one of a plurality of predetermined states; receiving the transmitted notification message at the monitoring system, determining whether one of the plurality of automatic responses corresponds to the transmitted notification message; and if one of the plurality of automatic responses corresponds to the transmitted notification message, executing the corresponding automatic response.

In a seventh aspect, some embodiments of the invention provide a system for transporting video signals. The system comprises: a first video processing device, the first video processing device comprising: an input module for conditioning a plurality of input video signals and producing a plurality of intermediate video signals, a crossover module coupled to the input module, the crossover module comprising a plurality of crossover input ports for receiving the intermediate video signals from the input module, a plurality of crossover output ports for outputting the plurality of intermediate input signals, and a switching module for routing the intermediate signals from the plurality of crossover input ports to the plurality of crossover output ports, and an output module coupled to the crossover output ports, the output module for conditioning the intermediate video signals and producing a plurality of output video signals; a second video processing device comprising a plurality of input ports; and a cable comprising a first plurality of ports and a second plurality of ports wherein the first plurality of ports is coupled to the plurality of crossover output ports of the first video processing device and the second plurality of ports is coupled to the plurality of input ports of the second video processing device to transport the plurality of intermediate video signals from the first video processing device to the second video processing device.

In an eighth aspect, some embodiments of the invention provide a method of transporting video signals. The method comprises: receiving a plurality of input video signals at a first video processing device; conditioning the plurality of input signals to produce a plurality of conditioned video signals; processing the plurality of conditioned video signals to produce a plurality of intermediate signals and transporting the plurality of intermediate video signals from the first video processing device to a second video processing device via a cable.

In a ninth aspect, some embodiments of the invention provide a video signal router. The video signal router comprises: an input module for receiving a plurality of encoded video signals; a plurality of video signal decoders coupled to the input module, the plurality of video signal decoders configured to receive the plurality of encoded video signals and produce a plurality of decoded video signals; a routing module coupled to the plurality of video signal decoders, the routing module comprising a plurality of input ports and a plurality of output ports and configured to receive the plurality of decoded video signals on the plurality of input ports and route each of the plurality of decoded video signals to a particular output port; and an output module coupled to the output ports of the routing module, the output module configured to receive the plurality of decoded video signals and produce a plurality of output signals.

BRIEF DESCRIPTION OF THE DRAWINGS

A preferred embodiment of the present invention will now be described in detail with reference to the drawings, in which:

FIG. 9 is a block diagram of another embodiment a system for monitoring a video signal network in accordance with at least one embodiment; and

DESCRIPTION OF EXEMPLARY EMBODIMENTS

Figure 1:
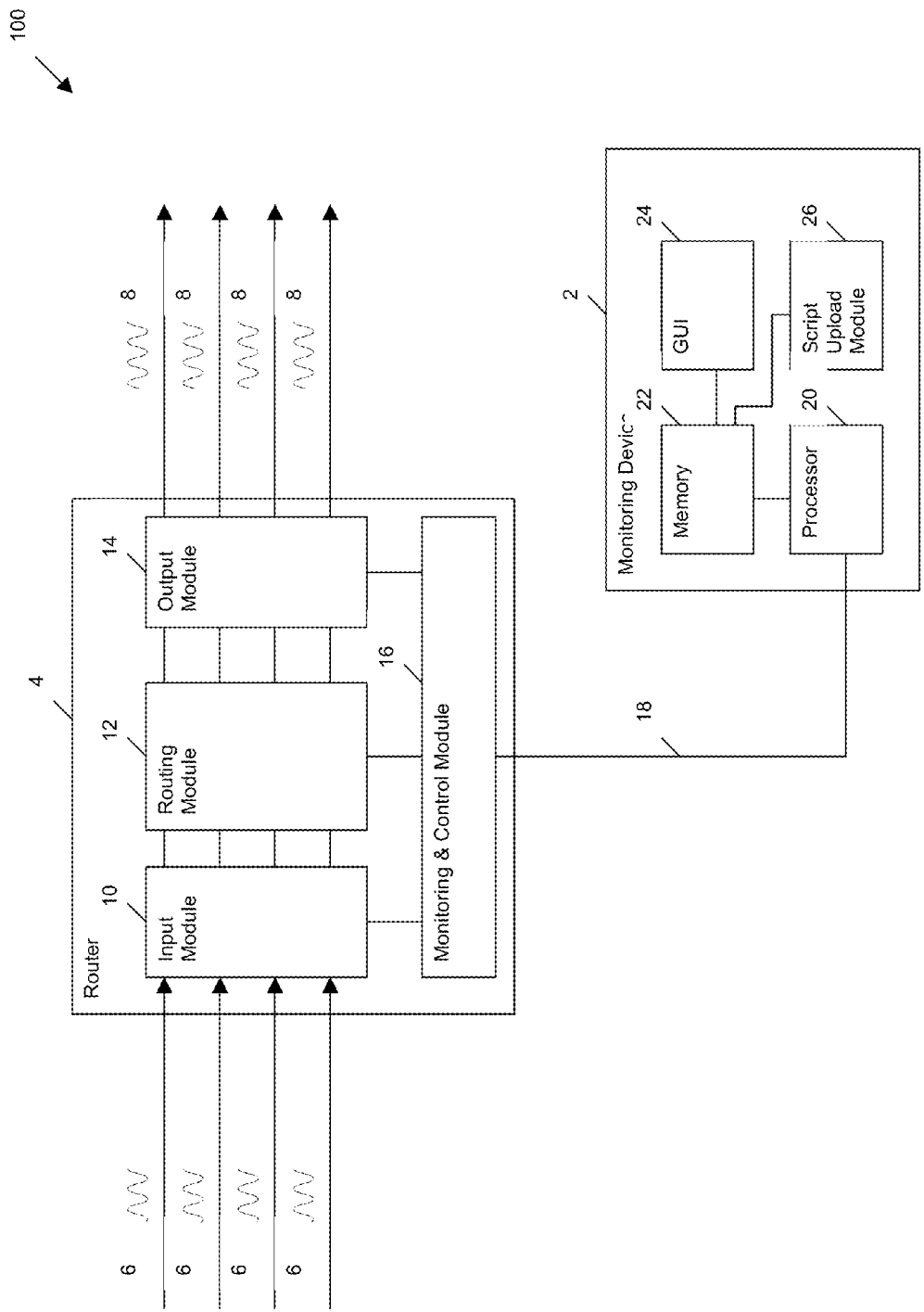
FIG. 1 is a block diagram of a system for monitoring a video signal network in accordance with at least one embodiment.

Reference is first made to FIG. 1, which illustrates a system 100 for monitoring a video signal network in accordance with an embodiment. The system 100 comprises a monitoring device 2 for monitoring a video signal network comprising a video signal router 4.

The video signal router 4 transports input video signals 6 to one or more output ports. The input video signals 6 may be received in a variety of digital video formats such as, standard definition serial digital interface (SD-SDI), high definition serial digital interface (HD-SDI), digital video broadcasting asynchronous serial interface (DVB-ASI), or society of motion picture and television engineers (SMPTE) 310M. The input video signals 6 may also be received in optical formats.

In the example shown in FIG. 1, the video signal router 4 comprises an input module 10, a routing module 12, an output module 14 and a monitoring and control module 16. The input module 10 receives the input video signals 6 and conditions them. For example, the input module 10 may comprise one or more cable equalizers or optical receivers. Equalizers are typically used to compensate for the distortion caused by the communications channel over which a video signal was transmitted. If the characteristics of the channel are known, the equalizer can be fixed, or non-adaptive. If the characteristics of the channel or not known the equalizer may be adaptive.

The routing module 12 receives the conditioned input signals from the input module 10 and routes or switches them to input ports of the output module 14. The output module 14 then prepares the received signals for transmission over a communications channel. For example, the output module 14 may comprise reclockers, cable drivers, optical transmitters and ADI deserializers. A reclocker is a device that employs a phase-locked loop (PLL) or similar device to extract a jitter free version of a clock signal which is then used to synchronize a signal. Reclockers are typically used because as signals pass through the routing module 12 the signals experience timing jitter. This timing jitter is manifested as a variation in the period of a signal waveform that typically cannot be removed by amplification and clipping. Reclockers are sometimes referred to as "retimers" or "data regenerators."

The monitoring and control module 16 is coupled to each of the other three router modules—the input module 10, the routing module 12 and the output module 14—to monitor and control the operation of these modules 10, 12, 14. The monitoring and control module 16 may be coupled to the other three router modules 10, 12, 14 via a suitable communications connection such as an Ethernet connection.

The monitoring and control module 16 monitors the input video signals 6, the output video signals 8, the routing module 12 and the router 4 itself. When any of the input video signals 6, the output video signals 8, the routing module 12 or the router 4 itself reach a predetermined state then the monitoring and control module 16 is configured to transmit a notification message to the monitoring device 2 via communications channel 18. In one embodiment the notification messages are SNMP (simple network management protocol) messages.

The following is a list of video signal parameters that the monitoring and control module 16 may monitor: mpeg bit rate too high, mpeg bit rate too low, transport stream errors, black duration, picture noise level, freeze duration, audio silence level, audio silence duration, video error duration, and expected useful bit rate. The monitoring and control module 16 may be configured to generate notification messages if any of these parameters reach a predetermined level or threshold.

The monitoring and control module 16 may also be configured monitor other characteristics of the router 4 and generate notification message if a predetermined condition occurs. For example, the monitoring and control module 16 may monitor the temperature inside the router 4 and generate notification messages if the temperature exceeds a threshold. Where the router is configured with multiple power supplies the monitoring and control module 16 may be configured to monitor the status of the power supplies and to generate a notification message when one of the power supplies fails.

The monitoring device 2 receives the notification messages transmitted by the router 4 and other video processing devices in the video signal network and can be configured to automatically respond to particular notification messages. In the example embodiment shown in FIG. 1, the monitoring device comprises a processor 20, a memory module 22, a graphical user interface (GUI) 24 and a script upload module 26.

The memory module 22 is used to store automatic responses associated with a particular triggering event. The automatic responses outline a procedure to be executed by the processor 20 when the triggering event occurs. Triggering events may comprise but are not limited to the receipt of a particular notification message from a device in the video signal network (e.g. router 4), or the occurrence of a particular time on a particular day. For example, an automatic response may be triggered every day at 5:00 PM. This can be used to schedule regular changes in the network configuration. For example, say a provider does not want to broadcast on a particular channel between certain hours, say between 3:00 AM and 5:00 AM each day, an automatic response could be generated to switch the video feed corresponding to that particular channel to a default video every day at 3:00 AM.

Automatic responses typically comprise at least one action step where an action step is an undertaking or activity that produces a tangible result. Action steps comprise, but are not limited to: displaying a warning message to the operator of the monitoring system, embedding an error message within a "bad" video signal notifying end users of a problem, and sending a reconfiguration message to a network device (e.g. router 4) to modify the configuration of the device. Action steps may also be referred to as "macros" and thus the terms "action step" and "macro" are interchangeable.

For example, where the notification message indicates that there is a problem with the audio level of a particular video signal, the action step of the automatic response may be to embed a message in the video signal notifying the end users that the problem is not local to them. The message may say something like "Please don't call, we are aware your audio signal is low." Notifying the end users in this manner may result in cost savings to the provider of the video signal since it will likely reduce the number of trouble calls unhappy customers will make to the provider's customer support centre.

Automatic responses may also comprise query steps. In a query step additional information is obtained and then a decision on what action step to take may be based on the additional information. Query steps essentially allow a user or system operator to generate "if" statements. Accordingly, automatic responses may be as sophisticated or as simple as required for particular situations. Query steps may also be referred to as "guard states" and thus the terms "query step" and "guard state" are interchangeable.

The additional information obtained in a query step may be the status of a particular device or signal. For example, if a notification message indicates that a primary video signal is "bad" or has been "lost", the automatic response associated with that notification message may comprise a step to query the router 4 to determine if the backup video signal is "good." If the backup signal is "good", the action step may be sending a reconfiguration message to the router 4 to modify its routing configuration to use the backup video signal. If the backup signal is "bad", then the action step may be to display a warning message to the system 100 operator notifying the operator that there is no backup video signal available.

The processor 20 is configured to receive notification messages generated by video signal network devices such as the router 4. Upon receipt of a notification message, the processor 20 looks to the memory module 22 to determine if an automatic response has been configured for that particular notification message. If no automatic response has been configured for that particular notification message then the processor 20 may be configured to do nothing or it may be configured to execute a routine action such as reporting the notification message in an error log. If an automatic response has been configured for that particular notification message then the processor 20 executes the automatic response.

The graphical user interface 24 provides the system 100 operator with a quick and simple way of generating automatic responses. The graphical user interface 24 is electrically coupled to the memory module 22 so that any automatic responses generated using the graphical user interface 24 can be stored in the memory module 22 for later use. An example embodiment of the graphical user interface 24 will be described in further detail with reference to FIGS. 2a, 2b and 2c.

The script upload module 26 provides the system 100 operator with an alternative method of adding automatic responses to the monitoring device 2. Specifically, the system operator 100 can generate an automatic response using a scripting language such as VSSL or XML and then load the scripts onto the monitoring device 2 using the script upload module 26. In one embodiment, a remote computer housing files with scripted automatic responses connects to the script upload module 26 and then transfers the files to the script upload module 26. The script upload module 26 converts the script into automatic responses and then saves the automatic responses in the memory module 22.

The following is an example of an acceptable script:

```
obj CreateConfigurationStateGuard("sample guard1") {
    config = "c1"
    guardName = "guard1"
}
obj CreateConfigurationStateGuard("sample guard2") {
    config = "c2"
    guardName = "guard2"
}
obj CreateConfigurationEqualityGuard( ){
    config = "c4"
    guardName = "c4guard"
    trueWhenUnequal = "true"
}
obj CreateAutoResponse ("auto response creator"){
    responseName = "my auto response"
    trigger ="my trigger composition"
    guardState = "my and guard"
    payload = "my payload composition"
}
```

Generating auto-responses via scripts may be advantageous for large-scale video signal networks where there will be a lot of duplication of actions or queries within the automatic responses. For example, say a router has twenty pairs of video signals where within each pair one of the signals is a primary signal and one is a backup signal. In this situation the system 100 operator may want to generate automatic responses for each pair that will instruct the router to switch to the backup video signal when a notification message indicating the primary video signal is "bad" is received. It may be faster to generate one script and modify only the port numbers within the script for each pair than to generate all twenty automatic responses using the GUI 24.

Figure 2A:
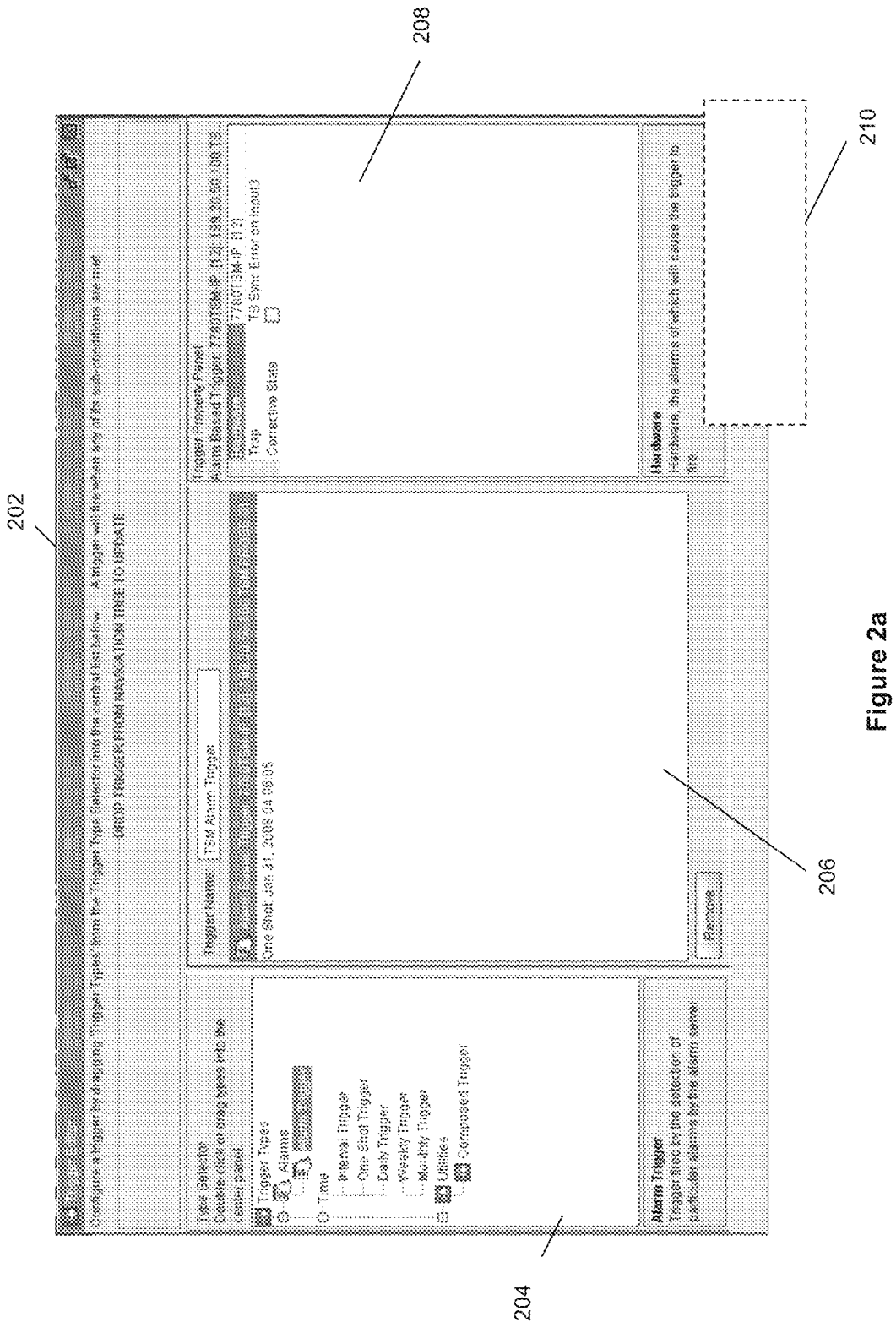
FIG. 2a is a screen shot of a trigger configuration screen of the graphical user interface (GUI) of FIG. 1 in accordance with at least one embodiment.
Figure 2B:
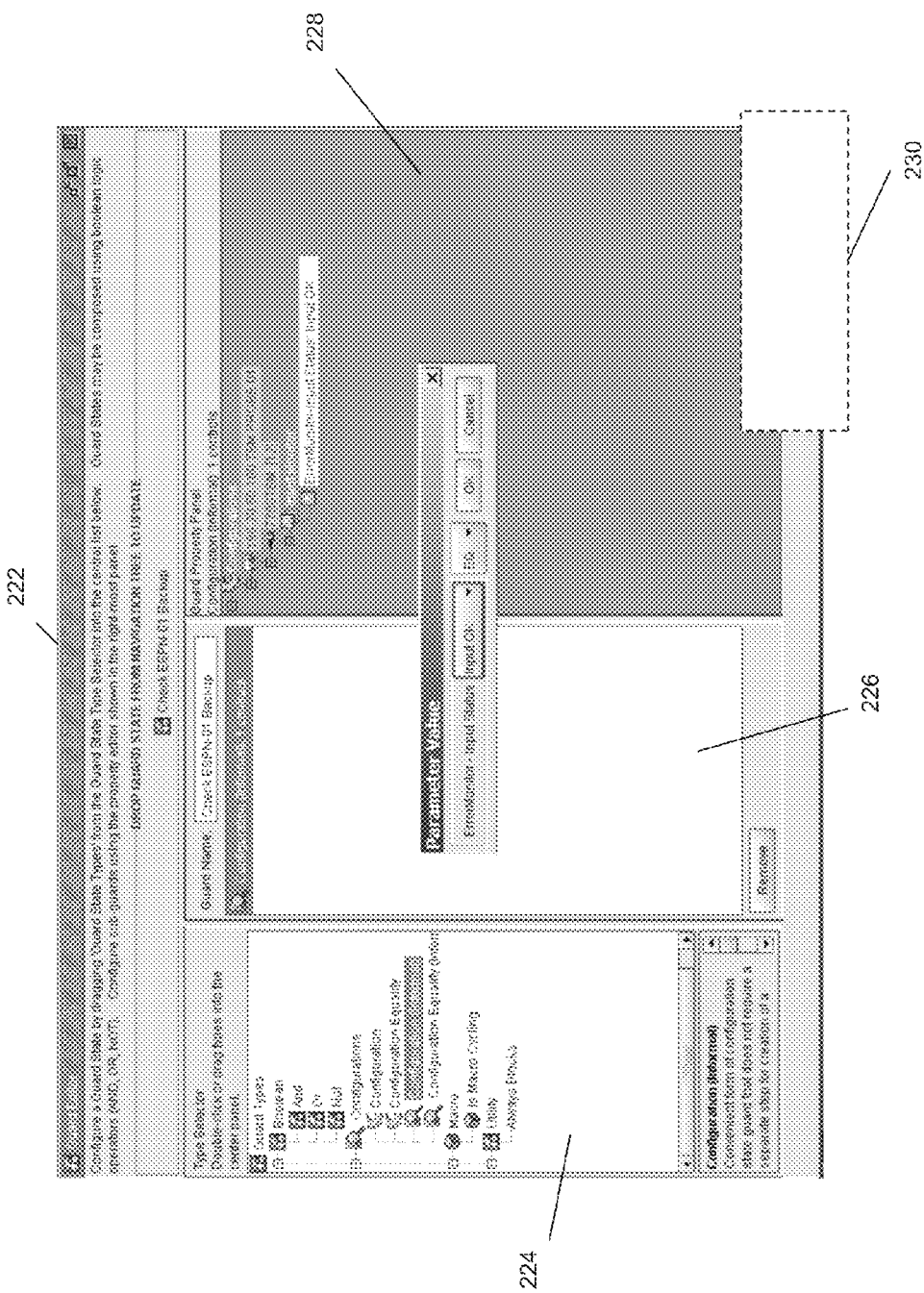
FIG. 2b is a screen shot of a query configuration screen of the graphical user interface (GUI) of FIG. 1 in accordance with at least one embodiment.
Figure 2C:
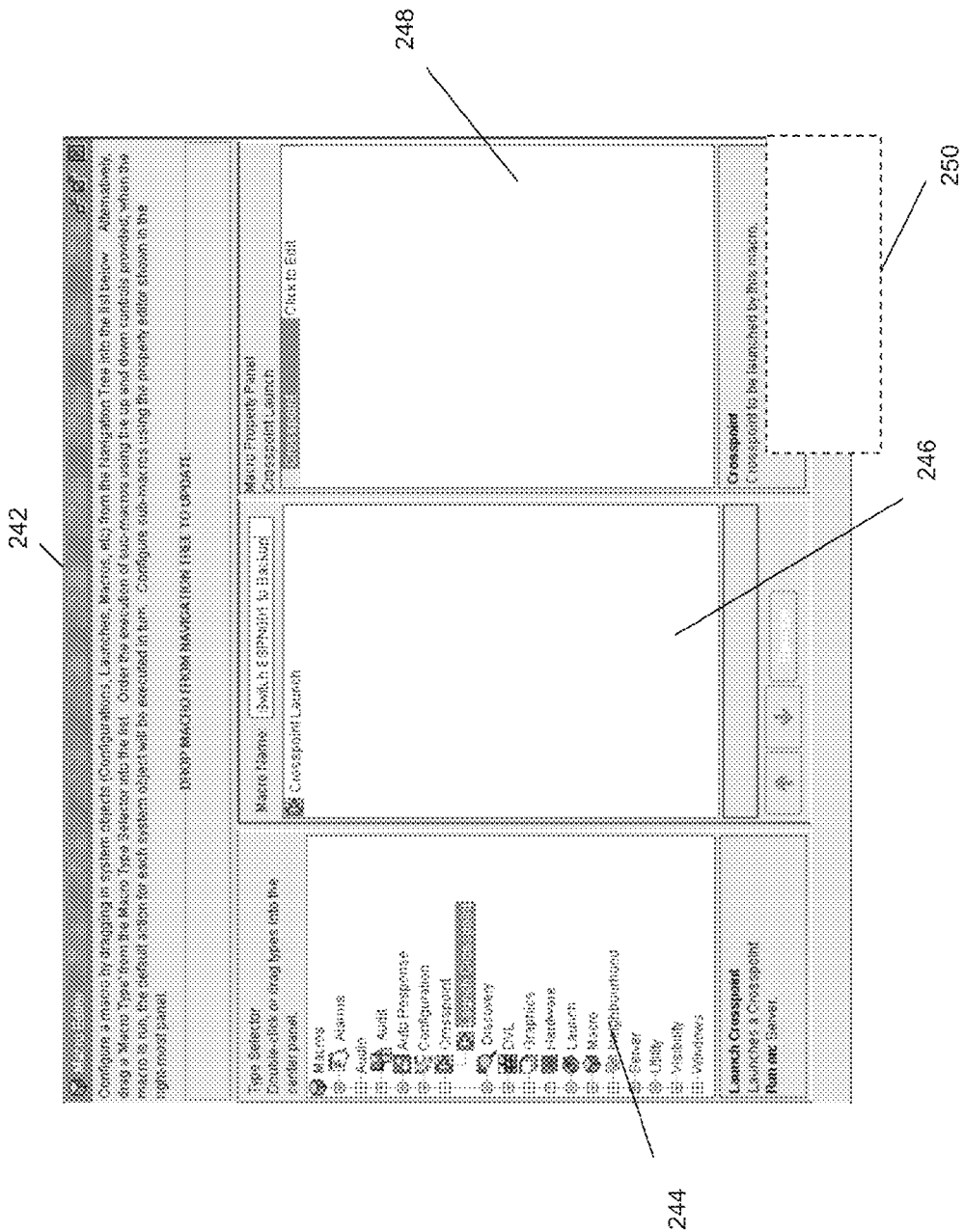
FIG. 2c is a screen shot of an action configuration screen of the graphical user interface (GUI) of FIG. 1 in accordance with at least one embodiment.

Reference is now made to FIGS. 2a, 2b and 2c, which show screen shots of the graphical user interface 24 of FIG. 1 in accordance with an exemplary embodiment. As described above, the graphical user interface 24 provides a system operator or user with means to quickly and easily generate automatic responses. Generating an automatic response typically involves the following three steps: (1) identifying an event that will trigger the processor 10 to run the automatic response; (2) configuring any query steps; and (3) configuring the action step or steps. However, since not all automatic responses have query steps, step (2) is optional. In one embodiment, the GUI 24 provides a different screen for each of these three steps.

Reference is now made to FIG. 2a, which shows a screen shot of an exemplary trigger configuration screen 202 of the graphical user interface (GUI) 24 of FIG. 1 in accordance with at least one embodiment. The trigger configuration screen 202 comprises a trigger type window 204, a trigger list window 206, a trigger properties window 208, and a set of action buttons 210.

The trigger type window 204 provides the user of the GUI 24 with list of available trigger types. As described above, an automatic response may be triggered upon receipt of a particular notification message or alarm, or based on a schedule. Other types of triggers are also possible. The user or system operator can select the type of trigger they want to use by double clicking on the trigger type or dragging the trigger type into the trigger list window 206. Once the user has selected a trigger type it will be displayed in the trigger list window 206.

The trigger list window 206 displays a list of all of the triggers configured on the monitoring device 2. The currently selected trigger will be highlighted. For example, in the example shown in FIG. 2a, the "Alarm Based Trigger" is currently selected. When a user selects a trigger type from the trigger type window 204 the selected trigger may automatically become the currently selected trigger in the trigger list window 206.

The trigger properties window 208 displays the properties of the trigger currently selected in the trigger list window 206. The properties displayed in the trigger properties window 208 are specific to the type of trigger currently selected. For example, the properties of an alarm-based or notification message trigger may comprise the hardware that generates the message and the type of message or trap generated. The properties of a one-shot trigger (a trigger that only runs once) may comprise the date and time at which the trigger is to run.

The user of the GUI 24 edits the trigger properties to define the trigger. For example, the user may select the "Alarm Trigger" type and then may edit the properties so that the automatic response will be triggered when a synchronization error on input 3 message is received from router #2. Once the user has selected a trigger type and set the properties of the trigger the user can move on to the next step in the configuration process by selecting the "OK" action button 210.

Reference is now made to FIG. 2b, which is a screen shot of a query configuration screen 222 of the graphical user interface (GUI) of FIG. 1 in accordance with at least one embodiment. The query configuration screen 222, similar to the trigger configuration screen 202, comprises a query type window 224, a query list window 226, a query properties window 228 and a set of action buttons 230.

The query type window 224 provides the user of the GUI 24 with list of available query types. The query may be, for example, a Boolean AND, OR or NOT expression. The user can select the type of query they want to use by double clicking on the query type or dragging the query type into the query list window 226. Once the user has selected a query type it will be displayed in the query list window 226.

The query list window 226 displays a list of all of the queries configured on the monitoring device 2. The currently selected query will be highlighted. For example, in the example shown in FIG. 2b, the "Configuration (Informal)" is currently selected. When a user selects a query type from the query type window 224 the selected query may automatically become the currently selected query in the query list window 226.

The query properties window 228 displays the properties of the query currently selected in the query list window 226. The properties displayed in the query properties window 228 are specific to the type of query currently selected in the query list window 226.

By editing the query properties the user defines the query that will be made. Once the user has selected a query type and set the properties of the query the user can move on to the next step in the configuration process by selecting the "OK" action button 230.

Reference is now made to FIG. 2c, which is a screen shot of an action configuration screen 242 of the graphical user interface (GUI) of FIG. 1 in accordance with at least one embodiment. The action configuration screen 242, similar to the trigger configuration screen 202, comprises an action type window 244, an action list window 246, an action properties window 248 and a set of action buttons 250.

The action type window 244 provides the user of the GUI 24 with list of available action types. As described above, an action may be changing the configuration of a network device (e.g. router 4), generating a notification message to the system 100 operator etc. The user can select the type of action to be executed by double clicking on the action type or dragging the action type into the action list window 246. Once the user has selected an action type it will be displayed in the action list window 246.

The action list window 246 displays a list of all of the actions that will be executed in this automatic response. The currently selected action will be highlighted. When a user selects an action type from the action type window 244 the selected action may automatically become the currently selected action in the action list window 246.

The action properties window 248 displays the properties of the action currently selected in the action list window 246. The properties displayed in the action properties window 248 are specific to the type of action currently selected in the action list window 246. By editing the action properties the user defines the action that will be executed. Once the user has selected an action type and set the properties of the action the user can complete the configuration process by selecting the "OK" action button 250.

Figure 3:
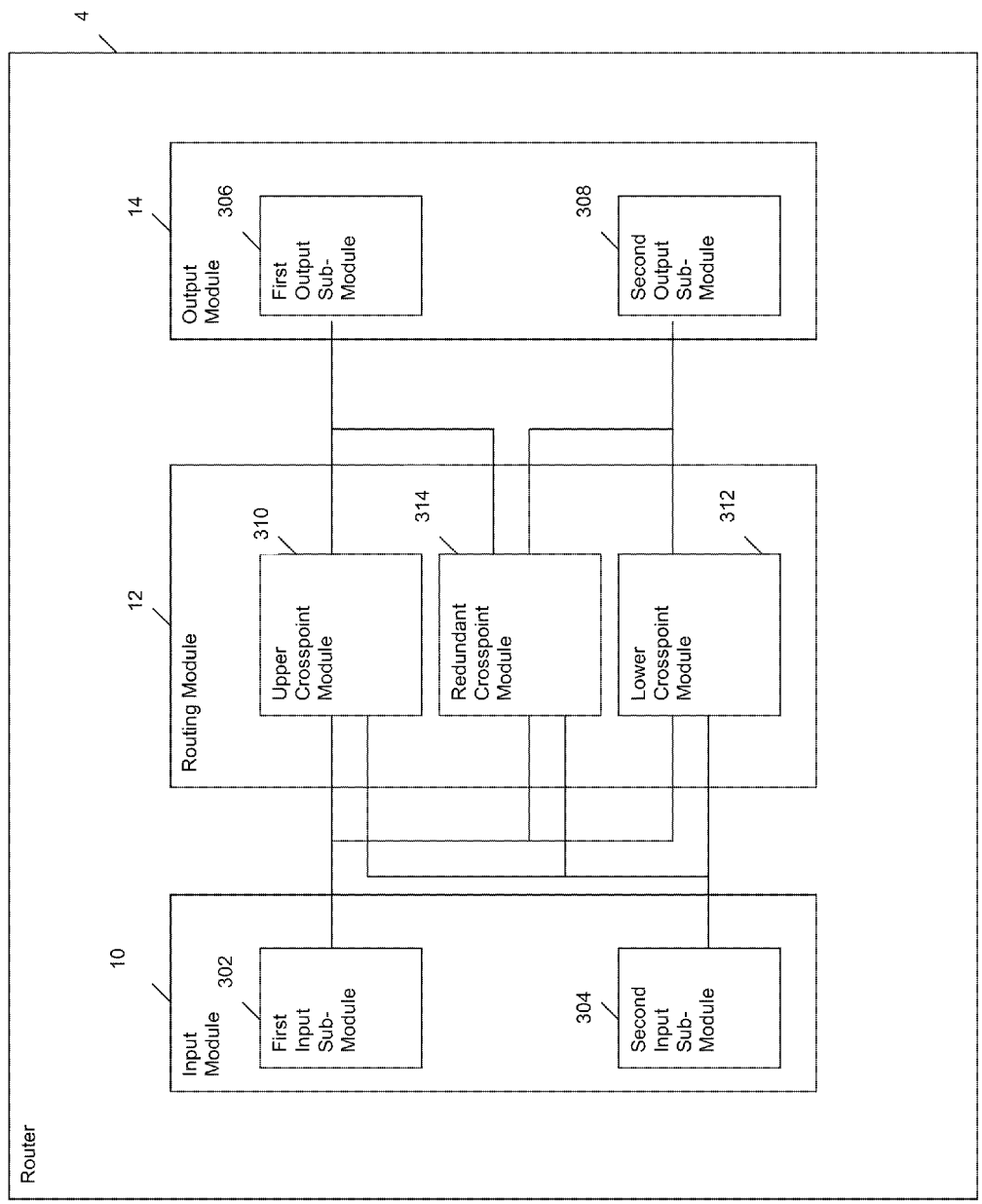
FIG. 3 is a block diagram of the video signal router of FIG. 1 in accordance with at least one embodiment.

Reference is now made to FIG. 3, which illustrates an exemplary embodiment of the router 4 of FIG. 1. The router 4 comprises an input module 10, a routing module 12, and an output module 14.

In the exemplary embodiment shown in FIG. 3, the input module 10 has two input sub-modules 302 and 304. As described above with reference to FIG. 1, the input module 10 typically conditions the input video signals 6 for processing by the routing module 12. In this embodiment the first input sub-module 302 conditions half of the input video signals 6 and the second input sub-module 304 conditions the other half of the input video signals. However, the input video signals 6 may be divided between the input sub-modules 302 and 304 in other manners. The first and second input sub-modules 302 and 304 may be comprised of a plurality of printed circuit boards (PCBs) where each board conditions a predetermined number of video input signals. In one embodiment, each board can condition up to eighteen input video signals.

In the exemplary embodiment shown in FIG. 3, the output module 14 also has two output sub-modules 306 and 308. As described above with reference to FIG. 1, the output module 14 typically is responsible for reclocking the signals received from the routing module 12 and conditioning them for transmission on an output port.

Optionally, in some embodiments, the first output sub-module 306 may reclock and condition some of the signals received from the routing module 12 and the second output sub-module 308 may reclock and condition the remaining signals received from the routing module 12. Similar to the input sub-modules 302 and 304, the first and second output sub-modules 306 and 308 may be comprised of a plurality of PCBs where each PCB reclocks and conditions a predetermined number of video signals. In one embodiment, each PCB can reclock and condition up to eighteen video signals.

In the exemplary embodiment shown in FIG. 3, the routing module 12 is comprised of three cross point modules: an upper cross-point module 310 for cross connecting the video signals from the first and second input sub-modules 302 and 304 to the first output sub-module 306; a lower cross-point module 312 for cross connecting the video signals from the first and second input sub-modules 302 and 304 to the second output sub-module 308; and a redundant cross-point module 314 for cross connecting the video signals from the first and second input sub-modules 302, 304 to the first and second output sub-modules 306, 308 when there is a failure with either the upper or lower cross-point module 310, 312. In this manner any input can be routed to any output in a fully redundant manner.

For example, if one input signal from the first input sub-module 302 is routed via the upper cross-point module 310 to the first output sub-module 306 and then that cross-point connection within the upper cross-point module 310 fails, the redundant cross-point module 314 can take over and cross connect the input signal to the first output sub-module 306.

In one embodiment the input sub-modules 302, 304, the output sub-modules 306, 308 and the cross-point modules 310, 312, 314 are connected to a single interconnection printed circuit board (PCB) and this PCB provides all of the interconnections between the modules.

Figure 4:
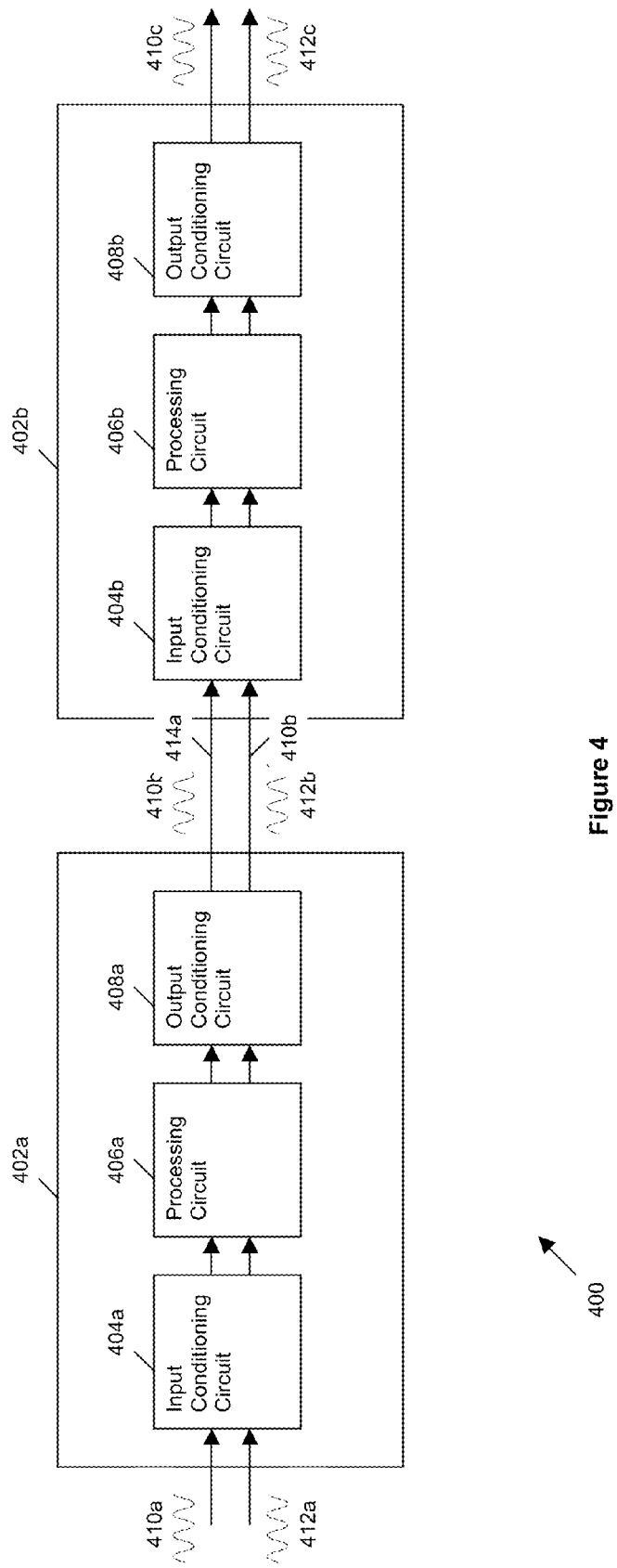
FIG. 4 is a block diagram of a known system for transporting video signals between video signal processing devices.

Reference is now made to FIG. 4, which illustrates a known system 400 for transmitting video signals between video signal processing devices 402a and 402b. In the known system 400 the video signal processing devices 402a, 402b are connected via standard cables such as coaxial cables with BNC connectors. Typically there is one cable per signal to be transmitted between the video signal processing devices. In this example there are two video signals (410b and 412b) to be transmitted between the video signal processing devices 402a and 402b thus there are two cables 414a and 414b between the devices 402a, 402b.

In system 400, prior to transmission, the transmitting device (e.g. video signal processing device 402a) conditions the video signals for transmission using an output conditioning circuit (e.g. 408a). As described above, output conditioning circuits prepare a signal for transmission over a particular communications channels. For example, where the signal is to be transmitted over a coaxial cable, the output conditioning circuit 408a may comprise a cable driver.

In system 400, upon receipt of the transmitted video signals the receiving device (e.g. video signal processing device 402b) conditions the video signals prior to processing using an input conditioning circuit (e.g. 404b). As described above, input conditioning circuits are typically used to remove distortions in the received input signal that were created during transmission. An input conditioning circuit may comprise an equalizer designed to compensate for the distortions. The equalizer may be fixed or adaptive.

Figure 5:
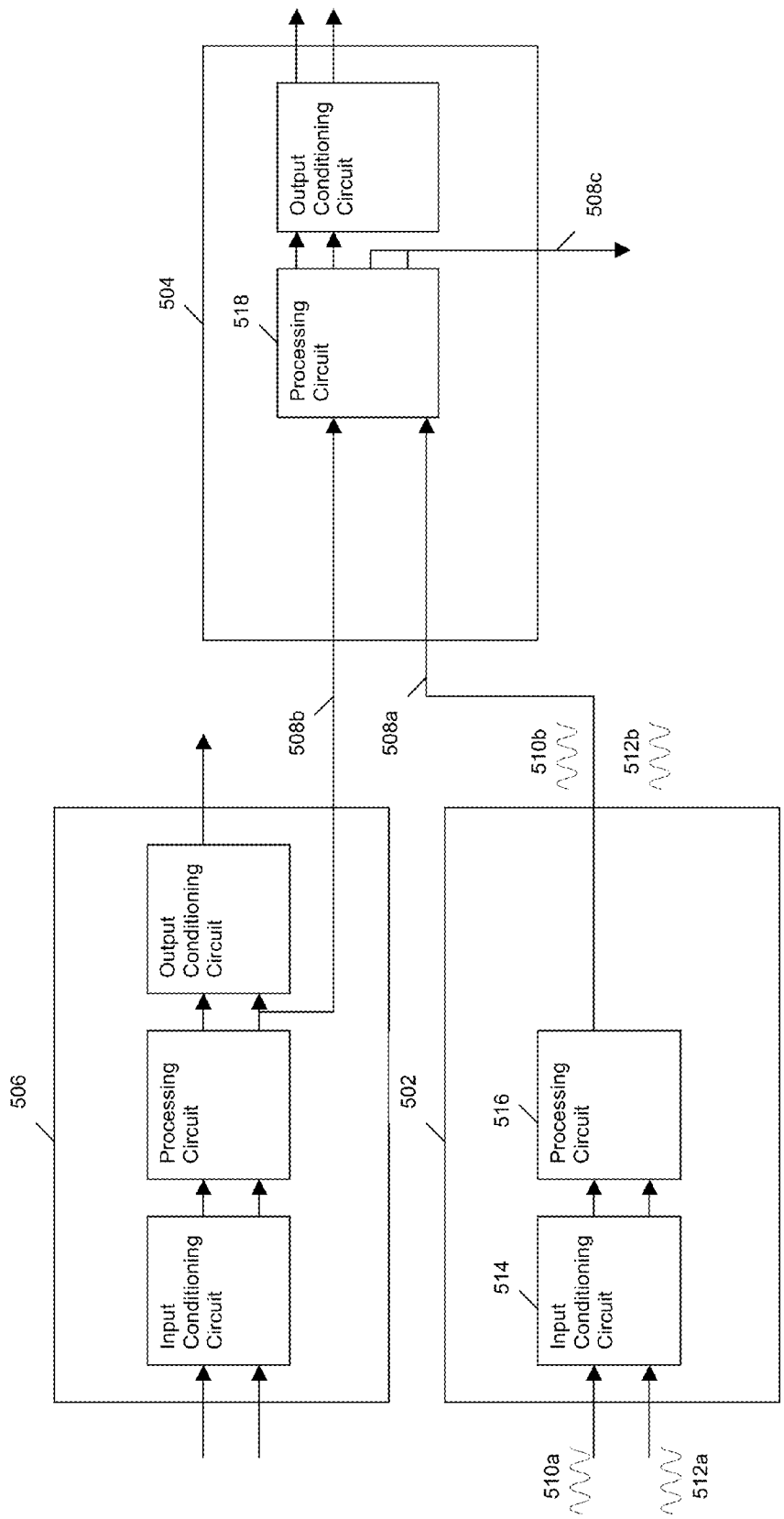
FIG. 5 is a block diagram of a system for transporting video signals between video signal processing devices in accordance with at least one embodiment.

Reference is now made to FIG. 5, which illustrates a system 500 for transmitting video signals between video signal processing devices 502, 504 and 506 in accordance with at least one embodiment. In system 500 the video signal processing devices 502, 504 and 506 are connected with x-link cables 508a, 508b that eliminate the need for conditioning circuits on either end of the cable. X-link cables have a sufficient bandwidth to transport multiple video signals between video signal processing devices. This is in contrast to standard coaxial cables which typically only transport one video signal at a time.

In the example system 500 shown in FIG. 5, the first and second video signal processing devices 502 and 504 are connected with an x-link cable 508a. The first video signal processing device 502 receives two input signal 510a, 512a. The first video signal processing device 502 conditions the video signals 510a, 512b using an input conditioning circuit 514 and then processes the conditioned signals using processing circuit 516. Then, instead of conditioning the processed video signals for transmission to the second video processing device 504, the first video processing device 502 may transmit the output from the processing circuit 516 directly to the second video signal processing device 504 via the x-link cable 508a.

The second video signal processing device 504 can then directly processes the received signals 510b, 512b using a processing circuit 518 without having to first condition the received signals 510b, 512b. The processed signals can then be directly transmitted to another video signal processing device using x-link cable 508c.

Eliminating the need for video signal processing devices to have input and output conditioning circuits provides a clear cost advantage over the known system 400. Not only does it reduce the number of components each video signal processing device requires, but it also reduces the space requirements thus the video processing devices can be smaller.

In addition, since one x-link cable can transport more than one video signal between video signal processing devices there is a cost savings in terms of running cables between the video signal processing devices. In one embodiment the x-link cable can transport up to 32 video signals. In this embodiment only one x-link cable has to be run between video signal processing devices to transport 32 video signals. In contrast, to transport the same 32 video signals between video signal processing devices using standard coaxial cables requires 32 different wires to be run between the video signal processing devices.

Figure 6:
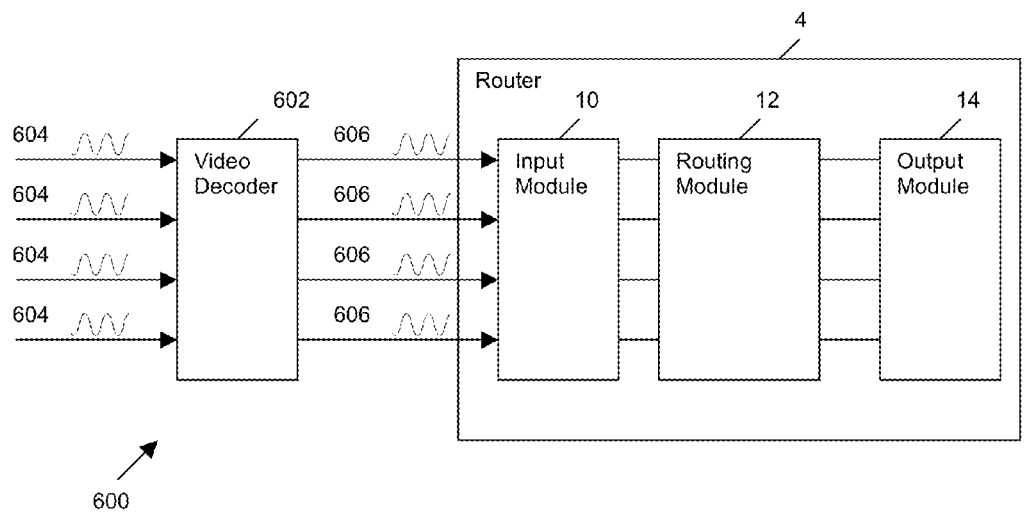
FIG. 6 is a block diagram of a known system for decoding and routing encoded video signals.

Reference is now made to FIG. 6, which illustrates a known system 600 for decoding and routing video signals. The system 600 comprises a video decoder 602 and a router 4.

The video decoder 602 receives encoded video signals 604 and outputs decoded video signals 606. For example, the decoder may receive ASI transport stream signals and output HD/SD SDI signals. The video decoder 602 may be a single device with a plurality of decoder circuits or it may be a group of individual decoder devices.

The router 4 receives the decoded video signals 606 and routes them to an appropriate output port. In the example shown in FIG. 6, router 4 comprises an input module 10 for conditioning the decoded video signals 606, an output module 14 for reclocking and conditioning received signals for transmission, and a routing module 12 for routing the conditioned and decoded video signals to a particular port of the output module 14.

Figure 7:
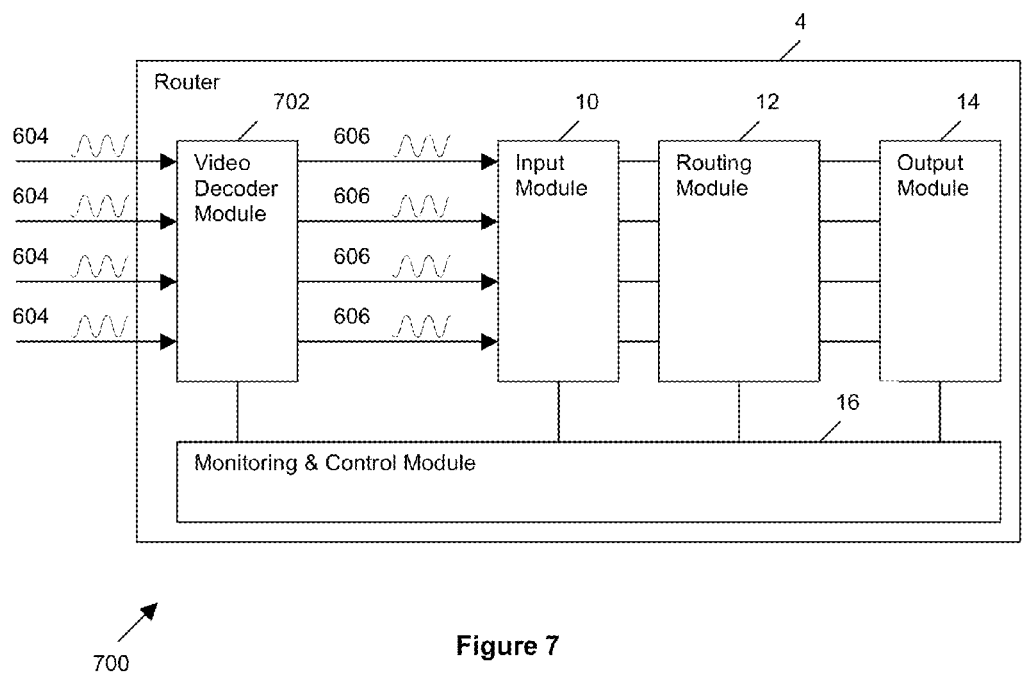
FIG. 7 is a block diagram of the router of FIG. 1 with an integrated decoder module in accordance with at least one embodiment.

Reference is now made to FIG. 7, which illustrated a system 700 for decoding and routing video signals in accordance with at least one embodiment. The system 700 comprises a router 4. In this embodiment the router 4 comprises a video decoder module 702, an input module 10, a routing module 12 and an output module 14. The decoder module 702 receives encoded video signals 604 and outputs decoded video signals 606. The input module 10 receives the decoded video signals 606 and conditions them for processing by the routing module 12. The routing module 12 then cross-connects the signals received from the input module 12 to specific ports of the output module 14.

The decoder module 702 may be a single printed circuit board (PCB) that houses a plurality of decoder circuits where each circuit can decode one encoded video signal. In one embodiment each decoder circuit converts an ASI signal to an HD or SD SDI signal.

By integrating the decoder module 702 with the router 4, the decoder module 702 can be coupled to the monitoring and control module 16. In this manner the decoder module 702 can be easily monitored and controlled by a central monitoring centre, such as the monitoring device 2 described in relation to FIG. 1. For example, the monitoring device 2 would be able to easily route a signal to a different decoder circuit within the decoder module 702 if there was a failure with a particular decoder circuit. To achieve the same level of monitoring and control with an external video decoder module would typically require the use of an external monitoring and control module. In addition, an integrated decoder is more power efficient than the external decoder 602 described in FIG. 6.

Figure 8:
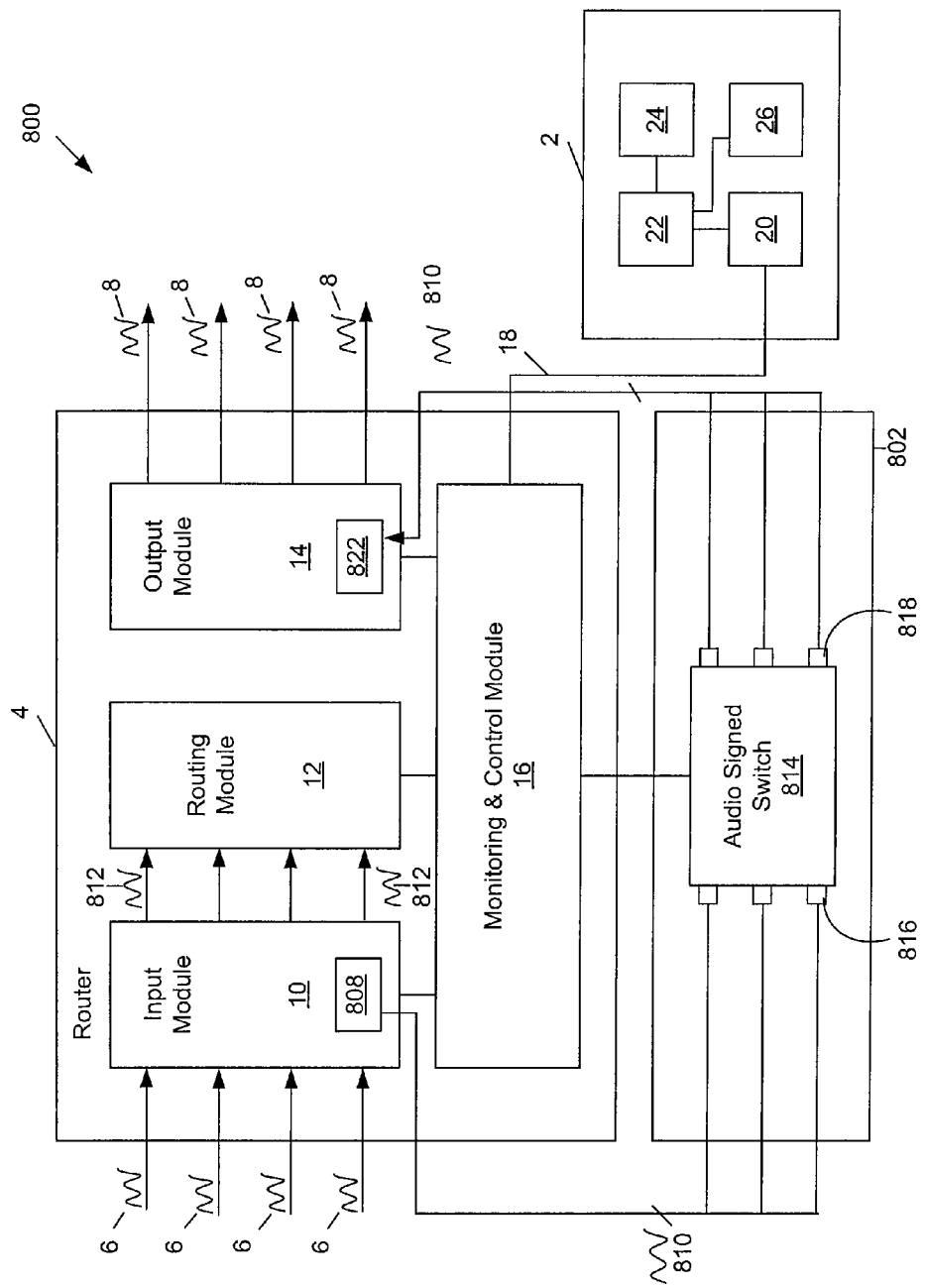
FIG. 8 is a block diagram of another embodiment a system for monitoring a video signal network in accordance with at least one embodiment.

Reference is next made to FIG. 8, which illustrates a system 800 according to the present invention. System 800 includes a router 4 and an audio processing module 802. Router 4 includes comprises an input module 10, a routing module 12 and an output module 14, a monitoring and control module. Audio processing module 802 includes an audio signal switch or cross-point 814.

Input module 10 has at least one input port to receive one or more video signals 6 that contain embedded audio. Each video signal may be in any analog or digital format. For example, some analog and digital video signal contain a single video signal and a pair of stereo audio signal. Some digital video signals that comply with standards set by the Society of Motion Picture and Television Engineers (SMPTE), such as SMPTE 259M, 344M, 292M, 372M and 424M, may contain a video signal with a number of embedded audio signals. In any case, the input module 10 is adapted to receive a plurality of audio signals that are embedded with one or more video signals. Input module 10 includes an audio de-embedder 808. Audio de-embedder 808 is coupled to each of the input ports to receive the video signals 6. Audio de-embedder 808 operates to de-embed at least some of the audio signals in at least one of the input video signals 6 and provide corresponding audio signals 810. In this embodiment, audio de-embedder 808 operates to de-embed audio from the video signals 6 in a sequential manner using a time-division multiplexed (TDM) process. During successive time slices, audio de-embedder 808 operates to sequentially de-embed audio from different input video signals 6 and generate corresponding audio signals 810. Audio signals 810 are coupled to audio processing module 802. Audio de-embedder 808 also provides video signals 812 corresponding to the video portion of at least some of the video signals 6. In some embodiments, some or all of the video signals 812 may contain embedded audio signals and/or may be identical to the input video signal 6. In other embodiments, some or all of the video signals 812 may contain only the video portion of the corresponding input video signal 6.

The routing module 12 operates under the control of the monitoring and control module 16 and couples video signals 812 from the input module 10 to ports on the output module 14.

Audio signal switch 814 receives the audio signals 810 at a plurality of audio signal input ports 816. Audio signal switch 814 then switches the audio signals to a plurality of audio signal output ports 818 under the control of monitoring and control module 16. The audio signal output ports 818 are coupled to output module 14. Output module 14 receives video signals 812 from routing module 12 and audio signal 810 from the audio signal switch 814. Output module 14 includes an audio embedder 822, which operates under the control of control and monitoring module 16 in a TDM process to embed specific audio signals 810 in specific video signals 814, thereby generating output video signals 8 having embedded audio.

System 800 provides an efficient method of de-embedding audio signals from the input video signals 6 and forming output signals 8 with different combinations of embedded audio signals. By sharing the use of a de-embedder in the input module 10 and an embedder in the output module 14, the number of de-embedders and embedders required in the system is reduced. In system 800, only a single de-embedder and a single embedder are provided. In other embodiments, additional de-embedders and/or embedders may be provided to suit the number and data rate of the audio and video signals processed by the system. Optionally, some de-embedders and/or embedders in some embodiments may be shared between several signals while other de-embedders and/or embedders may be dedicated to a single signal. In some embodiments, the monitoring and control module 16 may configure the input stage 10 or the output stage 14 differently at different times and a particular de-embedder or embedder may be configured to process different combinations of signals at different times. Each de-embedder and embedder is selected to operate at a sufficient speed to allow it to be used with the signals or signal to which it is assigned. In some embodiments, the inventors have used FPGA based devices that can operate at a relatively high speed and can be shared between a number of input and output video signals. Other types of embedders and de-embedders may also be used.

In embodiments according to system 800 and the variations described above, input module 10 may include one or more de-embedders 808 and output module 14 may include one or more embedders 822. In other embodiments, the input module 10 and/or the output module 14 may include other processing elements. For example, in some embodiments, the input module 10 may include a video format conversion module. Some or all of the input video signals 6 may be received in a particular video format and may be converted by the video format conversion module into a different formation. For example, some of the input video signals 6 may be in MPEG-2 transport streams. A video format conversion module may provide a corresponding base band PCM video stream. In some embodiments, the video format conversion module may be combined with additional modules, or may include functions to provide de-embedded audio signals 810, to adjust and control audio and/or video signal levels.

The input module 10 may include any number of processing elements, some or all of which may be shared between two or more input video signals 6.

The monitoring and control module 16 is coupled to each processing element in the input to control the sharing of the processing elements between input video signals and to control the operation of the processing element to provide different audio signals 810 and video signals 812.

Similarly, the output module 14 may include any number of processing elements, some or all of which may be shared between two or more output video signals 8 to process and combine video signal received from the routing module 12 and audio signals received from audio processing module 802. For example, the output module may include video format conversion modules to convert video signals 812 in one format, such as a base band PCM video stream to another format such as MPEG-2 or H.264 compressed format transport stream. Some or all of the processing elements in the output module 14 may be shared between two or more output video signal 8.

The processing elements in the input module 10 and the output module 14 are coupled to the monitoring and control module 16. As described above, the monitoring and control module 16 manages the operation of the processing elements to process input video signals 6 and to produce output video signals 8. In addition, the monitoring and control module may monitor the input video signals 6 and output video signals, as well as any other signals within the system, including video signal 812, audio signals 810, as well as the processing elements themselves. The processing elements provide information about characteristics of these signals to the monitoring and control module 16. The monitoring and control module 16 may be configured to generation notification messages based on these parameters. These notification messages may be triggering events for procedures that include changes to the coupling, configuration and operations of any part of the system 800, including the processing elements in the input module 10 and the output module 14.

Reference is next made to FIG. 9, which illustrates another system 900 according the present invention. System 900 is similar to system 800 and corresponding elements are identified by the same or similar reference numerals.

System 900 includes an audio processing module 902 that has an audio signal switch or cross-point 914, an input audio signal processing module 902 and an output audio signal processing module 904. System 900 also includes an audio signal pre-processor 906 and an audio signal post-processor 908.

Audio signal pre-processor 906 receives audio signals 910 from an external audio source and processes them to provide pre-processed audio signals 912. Input audio signal processing module 902 receives the pre-processed audio signals 912 as well as audio signal 911 from an external audio source. Input audio signal processing module 902 processes these signal and provides processed audio signals 915 to audio signal switch 914 at input ports 916. Audio signal switch 914 may be configured, under the control of monitoring and control module 16 to coupled processed audio signals 915 to output module 14 as audio signals 810, thereby making the processed audio signal 914 available for embedding in output video signal 8.

Audio signal switch 914 may also be configured, under the control of monitoring and control module 16, to couple audio signals 810 that have been de-embedded from input video signals 6 to output audio signal processing module 904. Output audio signal processing module 904 is configured to process the audio signals 810 to provides processed output signals 922. In this embodiment, some of the processed output signal 922 are processed in audio signal post-processor 908 to provide post processed output audio signals 924. Output audio signals 922 and 924 may be coupled to external audio devices.

In system 900, input audio signal processing module 902, output audio signal processing module 904, audio signal pre-processor 906 and audio signal post-processor 908 are all coupled to monitoring and control module 16. The monitoring and control module 16 controls these elements and also receives information from the elements about characteristics about the audio signals in these elements. The monitoring and control module 16 may generate notification message based on these characteristics. The notification message may be triggering events for procedures recorded in the monitoring device 2. The procedures may include changing the configuration of any part of system 900, including the audio processing element 902, 904, 906, 908.

In other embodiments, some or all of the audio processing elements 902, 904, 906, 908 may not be coupled to monitoring and control module and may have a fixed configuration or may be configured manually or using a different interface.

The audio processing elements 902, 904, 906, 908 may be adapted to provide specific audio processing depending on the signals transported and switched through system 900. In one embodiment, the audio signal pre-processor 906 receives analog and digital audio signals 910 and provides corresponding MADI (Multi-channel Audio Digital Interface) audio signals 912. Input audio processing module 902 receives MADI audio signals 911, 912 and provides corresponding processed audio signal 915 in a TDM compatible format. Output audio processing module signal processing module 904 receives the audio signals 810, which are in a TDM compatible format and provides processed audio signals 922 as MADI audio signals. Audio signal post-processor 908 receives the MADI audio signals 922 and provides analog and digital audio signals 924 to external audio devices. MADI audio signals 922 may also be provided to external audio devices. In other embodiments, the various audio processing modules may provided different types of processing depending on the nature of the audio signals received by the system and required by downstream devices.

In systems 800 and 900, de-embedders 808 and embedders 822 are shared among various input video signals 6 and output video signals 8 using time-division multiplexing (TDM). In other embodiments, different methods of sharing processing elements in the input and output modules may be used in place or in addition to TDM. In each embodiment, the audio signal 810, 915 and 920 will be compatible with the sharing technique used.

In some embodiments, audio processing elements 902, 904, 906 and 908 may also be shared between different audio signals using TDM or another sharing technique.

The present invention has been described here by way of example only. Various modification and variations may be made to these exemplary embodiments without departing from the spirit and scope of the invention, which is limited only by the appended claims.

We claim:

1. A method of operating a video signal network comprising:
    providing a video signal router having a plurality of input ports for receiving input video signals and a plurality of output ports for transmitting a plurality of output video signals, wherein the video signal router has a plurality of monitorable router status conditions, and wherein the video signal router has a routing module comprising switches for routing the input video signals from the plurality of input ports to the plurality of output ports;
    providing a router control system within the video signal router for controlling the configuration of the video signal router;
    defining, in the router control system, a plurality of predetermined states, wherein each of the predetermined states comprises at least one condition from the group consisting of:
        one or more signal conditions relating to one or more input and output video signal parameters being selected from the group consisting of a monitored bit rate of at least one of the input video signals, a monitored bit rate of at least one of the output video signals, a picture noise level, a video noise level, an audio noise level, an audio silence level, an audio silence duration, a video error duration, and a black duration; and
        one or more router conditions relating to one or more of the monitorable router status conditions;
    configuring the video signal router to couple at least some of the input ports to at least some of the output ports;
    monitoring, by the router control system, at least some of the input and output video signal parameters to provide monitored input and output video signals;
    monitoring, by the router control system, at least some of the monitorable router status conditions and the routing module to provide monitored router status conditions;
    providing a monitoring device in electronic communication with the video signal router and located remotely from the video signal router;
    defining, using a graphical user interface in the monitoring device, a plurality of trigger events, a first subset of the plurality of trigger events being associated with at least one of a plurality of received notification messages corresponding to the monitored input and output video signals and the monitored router status conditions, and a second subset of the plurality of trigger events being associated with a particular time;
    configuring, for each trigger event using the graphical user interface, an automatic response that outlines a procedure to be executed when the corresponding trigger event is detected;
    transmitting one of the plurality of notification messages from the router control system to the monitoring device when one of the monitorable router status conditions, the routing module and the at least some input and output video signal parameters reach one of a plurality of predetermined states; and
    executing, at a processor at the monitoring device, the procedure outlined by the automatic response corresponding to a trigger event from any one of the first and the second subset of the plurality of trigger events when the corresponding trigger event is detected.

2. A system for monitoring a video signal network, the system comprising:

a video signal router comprising:

a routing module comprising switches for routing a plurality of video signals from a plurality of input ports to a plurality of output ports; and a monitor for controlling the configuration of the routing module of the video signal router and monitoring the routing module, the video signal router and at least some input and output video signal parameters, wherein the at least some input and output video signal parameters are selected from the group consisting of a monitored bit rate of at least one of the input video signals, a monitored bit rate of at least one of the output video signals, a picture noise level, a video noise level, an audio noise level, an audio silence level, an audio silence duration, a video error duration, and a black duration, and transmitting one of a plurality of notification messages when one or more of the video signal router, the routing module and the at least some of the input and output video signal parameters reach one of a plurality of predetermined states; and a monitoring device in electronic communication with the video signal router and located remotely from the video signal router, the monitoring device comprising:

a graphical user interface for defining a plurality of trigger events, a first subset of the plurality of trigger events being associated with at least one of the plurality of notification messages corresponding to the one or more of the video signal router, the routing module and the at least some input and output video signal parameters, and a second subset of the plurality of trigger events being associated with a particular time;

the graphical user interface for configuring, for each trigger event, an automatic response that outlines a procedure to be executed when the corresponding trigger event is detected; and a processor for receiving the transmitted notification message, determining whether one of the plurality of trigger events from the first subset corresponds to the transmitted notification message, and if one of the plurality of trigger events from the first subset corresponds to the transmitted notification message, executing a corresponding automatic response corresponding to the trigger event, the processor being further configured to detect one or more of the plurality of trigger events from the second subset and executing a corresponding automatic response corresponding to each detected trigger event from the second subset.

3. The system of claim 2, wherein the procedure outlined by each automatic response comprises executing an action.

4. The system of claim 3, wherein
the routing module is configured to adjust the routing of the plurality of video signals from the plurality of input ports to the plurality of output ports upon receipt of a routing command message; and
the action of at least one automatic response comprises transmitting the routing command message to the router.

5. The system of claim 4, wherein
the plurality of video signals comprise a primary video signal and a corresponding backup video signal,
the routing module is initially configured to route the primary video signal to a particular output port of the plurality of output ports, and
the routing command message instructs the routing module to route the backup video signal to the particular output port.

6. The system of claim 5, wherein the action of at least one automatic response comprises alerting users of the video signal network of an error condition.

7. The system of claim 6, wherein alerting the users of the video signal network of the error condition comprises integrating a visible error message into one of the plurality of video signals.

8. The system of claim 3, wherein the procedure outlined by at least one automatic response comprises running a query and executing the action based on the results of the query.

9. The system of claim 8, wherein the query comprises requesting status information from the monitor of the video signal router.

10. The system of claim 2, wherein the monitoring device further comprises an automatic response input module for receiving pre-configured automatic responses.

11. A method of monitoring a video signal network, the method comprising:

defining a plurality of trigger events using a graphical user interface at a monitoring system, wherein a first subset of the plurality of trigger events is associated with at least one of a plurality of notification messages, and a second subset of the plurality of trigger events is associated with a particular time;

configuring, for the plurality of trigger events, a plurality of automatic responses using the graphical user interface at the monitoring system, wherein each automatic response outlines a procedure to be executed when a corresponding trigger event is detected;

monitoring a video signal router, a routing module comprising switches within the video signal router and a plurality of input and output video signal parameters using a monitor of the video signal router, at least some of the plurality of input and output video signal parameters being selected from the group consisting of a monitored bit rate of at least one of the input video signals, a monitored bit rate of at least one of the output video signals, a picture noise level, a video noise level, an audio noise level, an audio silence level, an audio silence duration, a video error duration, and a black duration;

transmitting one of the plurality of notification messages from the video signal router to the monitoring system, when one of the router and the plurality of input and output video signal parameters reach one of a plurality of predetermined states;

receiving each transmitted notification message at the monitoring system;

determining, at the monitoring system, whether one of the plurality of trigger events from the first subset corresponds to the transmitted notification messages and if one of the plurality of trigger events from the first subset corresponds to the transmitted notification message, executing the corresponding automatic response corresponding to the trigger event; and further determining, at the monitoring system, the occurrence of one or more of the plurality of trigger events from the second subset and executing a corresponding automatic response corresponding to each detected trigger event from the second subset.

12. The method of claim 11, wherein the procedure outlined by each automatic response comprises executing an action.

13. The method of claim 12, wherein the action of at least one automatic response comprises alerting users of the video signal network of an error condition.

14. The method of claim 13, wherein alerting the users of the video signal network of the error condition comprises integrating a visible error message into one of the plurality of video signals.

15. The method of claim 12, wherein the procedure outlined by at least one automatic response comprises running a query and executing the action based on the results of the query.

16. The method of claim 15, wherein the query comprises requesting status information from the monitor of the video signal router.

17. The method of claim 1, wherein the monitoring of at least some of the monitorable router status conditions comprises monitoring temperature inside the video signal router.

18. The method of claim 1, wherein the monitoring of at least some of the monitorable router status conditions comprises monitoring status of power supply to the video signal router.

19. The method of claim 1, wherein initiating the action corresponding to the transmitted notification message comprises alerting users of the video signal network of an error condition.

20. The method of claim 19, wherein alerting the users of the video signal network of the error condition comprises providing a visible error message into one of the plurality of output video signals.

21. The method of claim 1, wherein initiating the action corresponding to the transmitted notification message comprises reconfiguring the video signal router to couple at least some of the input ports to at least some other output ports.

22. The system of claim 2, wherein the monitoring device further comprises a memory module for storing the plurality of automatic responses.

23. The system of claim 2, wherein the monitoring device further comprises a script upload module, the script upload module being configured to receive at least one scripted response written in a scripting language and convert the at least one scripted response into at least one of the plurality of automatic responses.

24. The system of claim 23, wherein the at least one scripted response written in the scripting language comprises a scripted response written in Extensible Markup Language (XML).

25. The system of claim 23, wherein converting the at least one scripted response into the plurality of automatic responses comprises converting one scripted response into twenty automatic responses.

26. The method of claim 12, wherein the action of at least one automatic response comprises modifying configuration of the video signal router.

27. The method of claim 1, wherein monitoring at least some of the input and output video signal parameters comprises monitoring a parameter corresponding to network quality, the parameter being selected from the group consisting of a transport stream error and an expected useful bit rate.

28. The method of claim 1, wherein the at least some of the input and output video signal parameters, the at least some of the monitorable router status conditions and the routing module are monitored continuously by the router control system.

29. The system of claim 2, wherein the monitor is to continuously monitoring the routing module, the video signal router and at least some input and output video signal parameters.

30. The method of claim 11, wherein the at least some of the plurality of input and output video signal parameters are continuously monitored.

\* \* \* \* \*